M. W. MACDONALD.
FILM REGULATOR.
APPLICATION FILED JULY 16, 1914.
1,183,215.
Patented May 16, 1916.
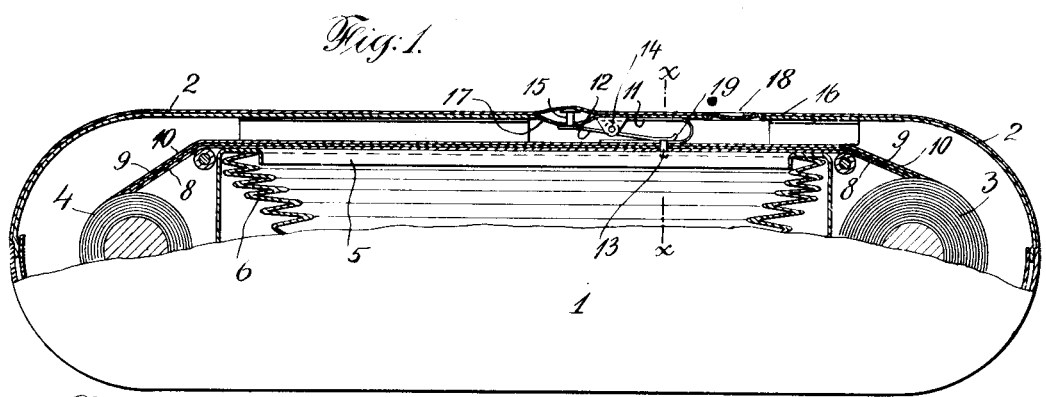
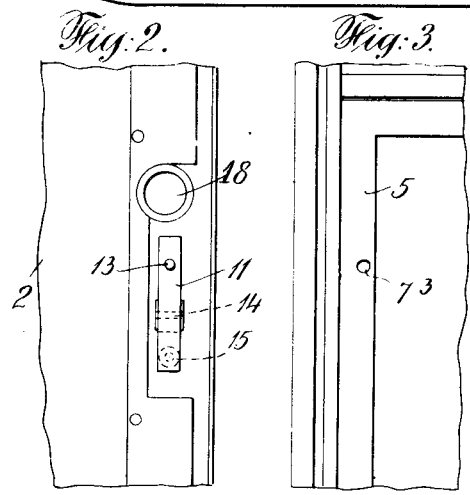
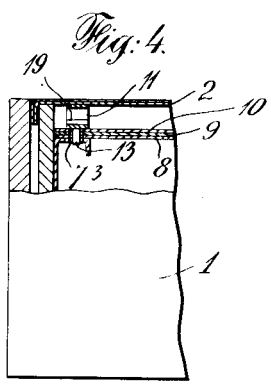
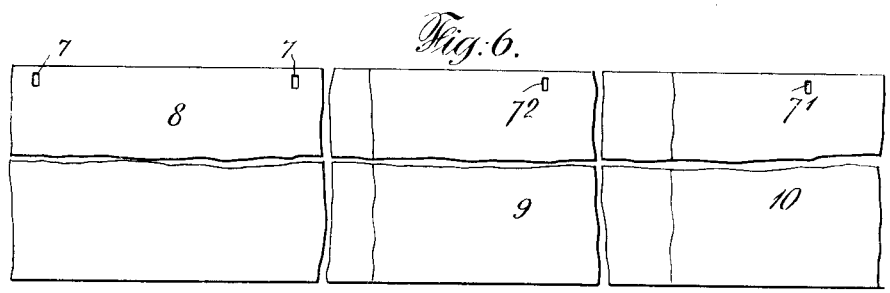
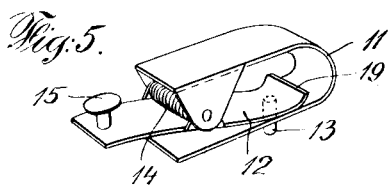
Witnesses:
Max B. A. Doring
Paul H. Franke
Inventor
Mott W. Macdonald
By his Attorneys
Marble + Matty

UNITED STATES PATENT OFFICE.

MOTT W. MACDONALD, OF ROCHESTER, NEW YORK, ASSIGNOR OF ONE-HALF TO WILLIAM STALKER, OF ROCHESTER, NEW YORK.

FILM-REGULATOR.

1,183,215.     Specification of Letters Patent.     Patented May 16, 1916.

Application filed July 16, 1914. Serial No. 851,405.

*To all whom it may concern:*

Be it known that I, MOTT W. MACDONALD, a citizen of the United States of America, and a resident of Rochester, Monroe county, State of New York, have invented certain new and useful Improvements in Film-Regulators, of which the following is a specification.

My invention relates to means for regulating the position of stoppage of photographic films and the like, as used in so-called film cameras. It is well known that in such cameras the film, after exposure, is often fed either too far or not far enough; in the one case film being wasted unnecessarily, and in the other case an overlapping of successive pictures being probable. To be sure, the so-called "daylight film cartridges" are commonly provided with a protecting strip, interwound with the film, which protecting strip carries on its back, marks adapted to be read through a suitable window in the back of the camera, the marks serving to indicate points at which the user should stop the film. But it is well known to users of such cameras, that somewhat close observation is required in order to avoid overrunning such marks; also, the user is often in doubt whether such a mark has not already passed the window without being observed. Furthermore, photographs are sometimes taken from positions at which the light is so dim that it is difficult to observe such marks through the necessarily colored glass of the window.

According to my invention, I provide means which positively arrests each section of the film when it has arrived in registry with the field of exposure of the camera; such arrest being accomplished without any act of the user other than the ordinary act of winding up the film on the winding spool of the camera; and I provide simple and easily actuated means for releasing the film when, after exposure, the exposed film is to be moved on and a new length or section of film brought into the field of exposure.

My invention consists in means for automatically arresting camera films as successive picture portions thereof are brought into registry with the field of exposure, and for releasing such films when further feed onward of the film is desired; and other features all as hereinafter described and particularly pointed out in the appended claims.

The objects of my invention are, to facilitate the feeding of the photographic film of film cameras, to avoid overlapping of successive pictures on the one hand, and unnecessary waste of film on the other hand; to avoid occasion for the camera user giving close attention to the feeding of the film in order to insure the feeding forward of precisely the proper length; to insure the feeding forward of the proper length of film, each time, without requiring conscious attention of the user to the length of film being fed; to provide for the easy and sure release of the film after each feeding operation; and to make the film arresting and releasing device employed very simple, very compact, inexpensive, and readily applicable to existing types of photographic cameras.

I will now proceed to describe my invention with reference to the accompanying drawings, and will then point out the novel features in claims.

Figure 1 shows a side elevation and partial longitudinal section of one well known type of film camera provided with film control means embodying my invention; Fig. 2 shows a fragmentary face view of the back of such camera removed and inverted, the film control device being therefore shown in top view; Fig. 3 shows a top fragmentary view of the film-frame and associated parts of the camera, with the back plate thereof removed; Fig. 4 shows a fragmentary end view and partial transverse section of the camera, the section being taken on the line $x$—$x$ of Fig. 1; Fig. 5 shows a detail elevation of the film control device, detached, the scale of this figure being larger than that of the preceding figures; and Fig. 6 shows a portion of a strip of film provided with edge perforations, at suitable intervals, to receive the arresting pin of the film control mechanism, as hereinafter described.

In the accompanying drawings numeral 1 designates the box of a camera of well known type, 2 the removable back plate of such camera, 3 the supply spool of such a camera, 4 the winding spool of such a camera, and 5 the film frame of such a camera, the said frame bounding the field of exposure. 6 designates the usual bellows. I have shown the camera in its usual folded condition, as my invention does not in any way involve the construction of lens, shutter, focusing mechanism, bellows, etc.

The construction and operation of the film supply spool and film winding spool and the operating mechanism of the latter, is not affected, nor is the construction of the film strip itself affected, except that such film strip is provided at suitable intervals (as indicated in Fig. 6) with marginal perforations 7, spaced apart a distance corresponding to the intended distance between pictures on such film; and when the film strip is provided with a protecting strip (as in the case of the daylight cartridge referred to) such protecting strip may also have a corresponding series of perforations, 7', (see Fig. 6); also when there is provided between the film strip and the protecting strip a layer of carbon paper or the like, as in the case of the so-called "autographic film cartridges" such carbon strip will itself be provided with corresponding perforations $7^2$ (Fig. 6). In Figs. 1 and 6, 8 designates the photographic film itself, 9 the said carbon paper, and 10 the protecting strip.

My film-control device comprises a combined support and stripper-plate 11 (see particularly Figs. 1 and 5) commonly secured to a suitable portion of the camera box (in the construction shown, secured to the removable back plate 2 of the camera box) to which support is pivoted a lever 12 provided at one end with a pin 13 adapted to pass through the perforations 7, 7' and $7^2$ of the film strip, protecting strip and carbon strip; a suitable spring 14 being provided which tends to press the pin 13 toward the film. The film frame is provided with a corresponding aperture $7^3$ (see Fig. 3) to receive the pin 13. The lever 12 is also provided with a push button 15 (Fig. 1) whereby the lever may be actuated to move the pin 13 out of engagement with the various apertures 7, 7', $7^2$ and $7^3$. I have shown the back plate 2 of the camera as provided with the usual covering-layer 16 of leather or other flexible material; and, as is usual with the push buttons of cameras so covered, the head of the push button 15 will be beneath this covering layer 16, and will be located in an aperture 17 of the back plate or other adjacent portion of the camera box, such aperture permitting actuation of the button 15 by pressure upon the cover layer 16 transmitted through such covering layer to the push button.

The support and stripper frame 11 is, advantageously, and as shown, of approximately U-shape, one side of the U resting upon the film (or, when the film is provided with a protecting strip as shown, resting upon the protecting strip); whereby lifting of the film itself, or the protecting strip, or the intermediate carbon strip, by the pin 13, is prevented.

It will be clear that the operation of feeding forward the film is the same as in an ordinary film camera; and that, as the film is drawn forward by rotation of the winding spool 4, as each series of perforations 7, 7' and $7^2$ come opposite the pin 13, the latter descends, under the influence of the spring 14, so automatically arresting the feeding of the film. These perforations 7, etc., being spaced apart precisely the distance corresponding to the intended spacing of the pictures on the film, the arrest of the film by the action of the pin 13 insures correct registry of each picture section of the film with the field of exposure, and insures such arrest without requiring any attention whatever on the part of the user. After exposing one section of the film, the push button 15 is pressed down so as to move the pin 13 out of engagement with the film strip and the corresponding strips 9 and 10, and the film may be fed onward in the usual manner; pressure upon the push button being released immediately after the motion of the film starts, so that the pin 13 may be free to drop into the perforations 7, 7' and $7^2$ when the next perforations arrive underneath the pin 13.

My invention therefore clearly obviates necessity for any close observation on the part of the user, of the distance through which the film is fed, and if the user merely feeds forward the film in the ordinary manner until the film is arrested by the action of the pin 13, he is assured that the film has been fed forward precisely the desired amount; thereby overfeeding of the film is obviated, also underfeeding of the film with consequent overlapping of pictures.

My invention does not interfere with the use of the usual markings on the back of the protecting strip in connection with a window, such as 18, through which such markings may be observed; but when my film control device is used, such window and the corresponding markings on the protecting strip, will be of utility only as showing the number of the film section which is in the field of exposure.

In order to prevent the pin 13 being lifted so high that it passes out of the corresponding perforation in the strip plate 11, I have provided the lever 12 with a projection 19 which will engage the back of the U shaped stripping plate before such pin 13 can have passed out of the perforation in the front portion of the stripping plate.

The orifices 7, 7' and $7^2$ in the film, protecting strip and carbon strip, respectively, are preferably made somewhat broader, transversely of the strips, than the pin 13, in order that engagement of such perforations by the pin 13 may be insured, notwithstanding some lateral wandering of the strips that are fed through the camera.

It will be obvious that my film-control device is susceptible of embodiment in various different forms, and I do not limit myself to the particular construction shown, but regard any device capable of automatically engaging and arresting the film at predetermined points on the film, as embodying my invention.

What I claim is:

1. Film-control means for photographic cameras comprising a combined support and stripper-plate, such stripper plate having an opening through it, a member pivotally connected to such combined support and stripper plate, and having strip engaging means passing through such opening of the stripper plate, said pivoted member having means adapted to engage the stripper-plate to prevent such strip engaging means from passing out of such opening.

2. Film-control means for photographic cameras comprising a combined support and stripper-plate of approximately U-form, one side of the U constituting a stripper plate, having an opening through it, a member pivotally connected to such combined support and stripper plate, and having strip engaging means passing through the said opening of the stripper plate, said pivoted member having a projection adapted to engage the other side of said U-shaped combined support and stripper plate, and thereby to prevent withdrawal of the said strip engaging means from the opening of the stripper plate.

In testimony whereof I have signed this specification in the presence of two subscribing witnesses.

MOTT W. MACDONALD.

Witnesses:
H. M. MARBLE,
PAUL H. FRANKE.